Feb. 18, 1964   R. R. HAZELL   3,121,685
FILTER
Filed Dec. 12, 1960
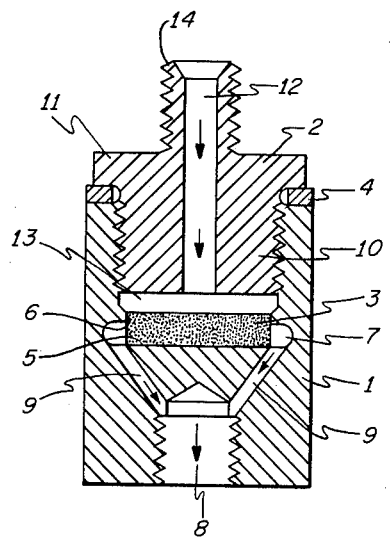
INVENTOR.
RAYMOND RICHARD HAZELL
BY
*Arthur H. Serrell*
ATTORNEY 3,121,685
FILTER
Raymond Richard Hazell, Slough, England, assignor to
The Sperry Gyroscope Company Limited, Brentford,
England, a British company
Filed Dec. 12, 1960, Ser. No. 75,438
Claims priority, application Great Britain Dec. 11, 1959
2 Claims. (Cl. 210—446)

This invention relates to filters and particularly pertains to means for filtering the hydraulic fluid in the flow line of a high-pressure hydraulic system.

It is one of the objects of the invention to provide a filter and flow line coupling combination in which the filter element is well adapted to withstand the substantial forces which may act upon it in the event that it becomes blocked.

According to the invention the improved filtering means includes a filter element in the form of a slab or block of rigid porous material and a flow line coupling having upstream and downstream members that provide a chamber of cylindrical configuration arranged with its longitudial axis corresponding to the line of fluid flow. The upstream member of the coupling includes an inlet passageway and the downstream member includes an outlet passageway. The chamber provided by the coupling includes a peripheral wall, an upstream end wall, a flat impervious downstream end wall, and an annular channel in the peripheral wall adjacent the downstream end wall. The filter of the combination is provided by a block of rigid porous material of a cylindrical configuration conforming to the chamber. The block includes a peripheral surface with an upstream portion that abuts the peripheral wall of the chamber and a downstream portion adjacent to the annular channel, an upstream end surface, and a flat downstream end surface that abuts the downstream end wall of the chamber. In the improved coupling structure, the upstream end wall of the chamber is provided by the upstream member and the peripheral wall, downstream end wall and annular channel of the chamber is provided by the downstream member. The block provides a filter through which the fluid in the coupling flows from the inlet passageway of the upstream member to the outlet passageway in the downstream member by way of the channel and a passageway means included in the downstream member between the annular channel and the outlet passageway.

In the embodiment of the invention shown in the drawing, the filter element is a solid cylinder having parallel plane end faces joined by a circumferential side face, the coupling includes a line connecting member with an inlet passage and a line connecting member with an outlet passage. The side wall of the chamber provided by the connected members includes an annular channel adjacent the impervious end wall of the outlet member. Also, the wall of the chamber provided by the inlet member of the coupling is axially spaced from the inlet end or face of the filter.

In order that the invention may be clearly understood and readily carried into practice, a filter and coupling combination embodying the invention will now be described by way of example with reference to the single figure of the accompanying drawing.

The improved filtering means includes a coupling consisting of an outlet line connecting member 1 and an inlet line connecting member 2, a filter element constituted by a solid cylindrical block or disc 3 of rigid porous sintered material, and a washer 4 providing a seal between the upper and lower housing members. The flow line through the coupling corresponds to the longitudinal axis or axis of symmetry of the cylindrical filter 3.

The outlet coupling member 1 has a chamber with a plane circular surface or flat end wall 5 normal to the axis against which the downstream end surface of the element 3 abuts, and a peripheral wall or surface 6 against which the peripheral surface of the filter element 3 abuts. The arrangement provides a line of fluid flow through the coupling and filter element that corresponds with the longitudinal axis of the filter element 3. As shown, the peripheral wall 6 of the downstream member 1 includes an annular channel 7 adjacent the impervious flat end wall 5. Channel 7 is connected to threaded outlet passageway 8 in the outlet line connecting member 1 by way of a plurality of connecting passages 9. The connecting passages 9 in the downstream member 1 provide a passageway means between the outlet passageway 8 and the annular channel 7.

The inlet member 2 provides a threaded portion 10 which screws into a correspondingly threaded opening in the outlet coupling member 1, and also provides shoulders 11 which co-operate with the washer 4 and the rim constituting a portion of the member 1 to form a fluid-tight seal between the connecting coupling members. The inlet line connecting member 2 also has a central inlet passageway 12 which opens into a chamber 13 provided by the connected coupling members 1 and 2. In the arrangement shown, the lengthwise axial dimension of the chamber 13 is greater than the corresponding dimension of the filter element. Accordingly, the wall of the chamber provided by the inlet member 2 of the coupling is axially spaced from the inlet end or face of the filter element. A threaded spigot 14 surrounding passageway 12 enables an inlet member 2 to be connected to the flow line.

When the filtering means is operating in the line, the fluid which requires cleaning enters the coupling member 2 under pressure through inlet passageway 12, flows through the filter element in a substantially axial direction toward the impervious wall of the outlet member and radially off the axis to the channel 7. Finally the fluid leaves the outlet member 1 by way of connecting passages 9 and outlet passageway 8.

Now when there is fluid flow through the filter element, the forces exerted by the fluid on the filter element are obviously partly axial and partly radial. If, however, the filter element is allowed to become completely clogged before it is changed, due to the formation of an impervious layer of dirt or contaminating substance in the pores, there will no longer be any flow and corresponding pressure gradient through the filter. This means that the only force exerted upon the filter element by the fluid is an evenly distributed force acting axially upon the open surface of the filter element at the inlet end of the coupling. This force is balanced by an evenly distributed reactive force exerted in the opposite direction by the flat impervious wall 5 of the outlet member 2. As the opposite end walls of the cylindrical filter element are parallel, the forces acting upon the element from the inlet end are limited to compressive forces. The element is better adapted to withstand these forces than the bending and shearing forces which would act upon it if it were mounted as a diaphragm between two chambers communicating with the respective end faces. Even if a supporting grid or other means providing a perforated supporting surface were provided to fit the outlet end of the filter element, the element would still be subjected to externally applied shearing forces.

The invention is not limited to embodiments where the flow direction of the fluid in the inlet coupling member corresponds to the axis of symmetry of the filter element. While a preferred embodiment of the invention has been described, it will be understood that the words which have been used are words of description rather than limitation and that changes within the purview of the appended claims may be made without departing from the true scope and spirit of the invention in its broader aspects.

I claim:

1. Filtering means for the fluid flowing in a hydraulic line including a coupling having a member located in upstream relation in the line having an inlet passageway, a member having an outlet passageway located in downstream relation in the line providing a chamber of cylindrical configuration with the upstream member arranged with its longitudinal axis corresponding to the line of fluid flow, said chamber having a peripheral wall, an upstream end wall, a flat impervious downstream end wall, and an annular channel in the peripheral wall adjacent the downstream end wall, passageway means in the downstream member connecting the outlet passageway and the annular channel, and a block of rigid porous material of a configuration conforming to the cylindrical chamber having a peripheral surface with an upstream portion abutting the peripheral wall of the chamber and a downstream portion adjacent to the annular chamber, an upstream end surface, and a flat downstream end surface abutting the downstream end wall of the chamber providing a filter through which the fluid from the inlet passageway flows to the outlet passageway by way of the channel and passageway means.

2. Filtering means of the character claimed in claim 1, in which the upstream end wall of the chamber is provided by the upstream member, and in which the peripheral wall, the flat downstream end wall and the downstream annular channel in the peripheral wall of the chamber is provided by the downstream member.

References Cited in the file of this patent
UNITED STATES PATENTS 2,748,802   Hanson et al. _____ June 5, 1956

FOREIGN PATENTS 945,801   Germany _____ July 19, 1956